United States Patent
Liang et al.

(10) Patent No.: US 12,524,189 B2
(45) Date of Patent: Jan. 13, 2026

(54) DATA TRANSMISSION METHOD, SYSTEM, DEVICE, ELECTRONIC EQUIPMENT, AND STORAGE MEDIA

(71) Applicants: GUANGZHOU SHIYUAN ELECTRONIC TECHNOLOGY COMPANY LIMITED, Guangzhou (CN); GUANGZHOU SHIYUAN INNOVATION TECHNOLOGY CO., LTD., Guangzhou (CN)

(72) Inventors: Daochao Liang, Guangzhou (CN); Jiangshan He, Guangzhou (CN)

(73) Assignees: GUANGZHOU SHIYUAN ELECTRONIC TECHNOLOGY COMPANY LIMITED, Guangzhou (CN); GUANGZHOU SHIYUAN INNOVATION TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 18/979,494

(22) Filed: Dec. 12, 2024

(65) Prior Publication Data
US 2025/0110685 A1    Apr. 3, 2025

Related U.S. Application Data

(63) Continuation of application No. PCT/CN2022/133904, filed on Nov. 24, 2022.

(30) Foreign Application Priority Data

Sep. 13, 2022  (CN) .......................... 202211110028.1

(51) Int. Cl.
G06F 3/14    (2006.01)

(52) U.S. Cl.
CPC .................................. *G06F 3/1454* (2013.01)

(58) Field of Classification Search
CPC ..... H04L 65/403; H04L 12/1813; H04N 7/15; H04N 7/147; H04N 7/141; G06F 3/1454;
(Continued)

(56) References Cited

U.S. PATENT DOCUMENTS 11,012,665 B2 * 5/2021 Jaynes ..................... H04N 7/15
2007/0242066 A1 * 10/2007 Levy Rosenthal .... H04N 5/272
345/419

* cited by examiner

*Primary Examiner* — Koosha Sharifi-Tafreshi
(74) *Attorney, Agent, or Firm* — BAYES PLLC

(57) ABSTRACT

The present disclosure provides a data transmission method, system, device, electronic equipment and storage medium. The method includes: transmitting, by a virtual camera driver, a data request instruction to a service module in response to a virtual camera of a conferencing application being selected; starting, by the service module, a first data screen mirroring application in response to the data request instruction; establishing a communication connection between the terminal device and a target device; transmitting a media-data obtaining instruction to the second data screen mirroring application through the first data screen mirroring application; receiving, by the first data screen mirroring application, first media data collected by a camera of the target device based on the media-data obtaining instruction; and transmitting, by the first data screen mirroring application, the first media data to the virtual camera driver.

19 Claims, 6 Drawing Sheets

(58) Field of Classification Search
CPC .......... G06F 3/14; G06F 3/1423; G06F 9/452; H04M 3/567; G09G 5/14
See application file for complete search history.

DATA TRANSMISSION METHOD, SYSTEM, DEVICE, ELECTRONIC EQUIPMENT, AND STORAGE MEDIA

CROSS-REFERENCE TO RELATED APPLICATION

The present application is a continuation of International Application No. PCT/CN2022/133904, filed on Nov. 24, 2022, which claims the benefit of priority to Chinese Patent Application No. 202211110028.1, filed on Sep. 13, 2022, entitled "DATA TRANSMISSION METHOD, SYSTEM, DEVICE, ELECTRONIC EQUIPMENT, AND STORAGE MEDIA." The entire contents of each of the above-identified applications are expressly incorporated herein by reference.

TECHNICAL FIELD

The present disclosure relates to the technical field of data transmission, and in particular to, a data transmission method, system, device, electronic equipment and storage medium.

TECHNICAL BACKGROUND

A conference board is a display device with intelligent interactive functions. The display function of a conference board is often used extensively during traditional video conferencing, such as a video frame of a smartphone or laptop is projected onto a conference board for user viewing. Since the camera performance of the conference board is better than a terminal device carried by the user, invoking the camera of the conference board through the terminal device is also a function frequently used by users. In the related art, invoking the camera of a conference board through a terminal device requires the help of a data screen mirroring application, and the data screen mirroring application may be used to establish a connection between the terminal device and the conference board. In the conventional solution, the user must first open the data screen mirroring application, and then establish a connection between the terminal device and the conference board through the data screen mirroring application, and the user is then required to open the conferencing application and set the video source to an option corresponding to the camera of the conference board. However, in the process of implementing the above solution, it was found that based on the conferencing application usage habits of most users, users will directly open the conferencing application. However, at this time, the data screen mirroring application is often not running or the connection between the terminal device and the conference board is not established, resulting in the conferencing application video frame being black, which brings great trouble to users.

SUMMARY

In order to solve the problem in the related art that the data screen mirroring application is often not running or the connection between the terminal device and the conference board is not established, resulting in the opened conferencing application video frame being black, the present disclosure provides a data transmission method, system, device, electronic equipment and storage medium to achieve the technical purposes of automatically opening the data screen mirroring application, establishing the connection between the terminal device and the conference board, and providing the video frame of the conferencing application.

In order to achieve the above technical purposes, according to the present disclosure, a data transmission method is provided, which includes:
transmitting, by a virtual camera driver, a data request instruction to a service module in response to selecting a virtual camera of a conferencing application;
starting, by the service module, a first data screen mirroring application in response to the data request instruction; where the conferencing application, the first data screen mirroring application, the virtual camera driver and the service module are run on a terminal device;
establishing a communication connection between the terminal device and a target device by connecting the first data screen mirroring application with a second data screen mirroring application; where the second data screen mirroring application is run on the target device;
transmitting a media-data obtaining instruction to the second data screen mirroring application through the first data screen mirroring application; wherein the second data screen mirroring application obtains first media data collected by a camera of the target device based on the received media-data obtaining instruction, and transmits the first media data to the first data screen mirroring application; and
transmitting the first media data to the virtual camera driver through the first data screen mirroring application so as to display a video frame corresponding to the first media data on the conferencing application.

In order to achieve the above technical purposes, according to the present disclosure, a data transmission method may be further provided, which includes:
starting a first data screen mirroring application in response to selecting a virtual camera of a conferencing application; where the conferencing application and the first data screen mirroring application are run on a terminal device;
establishing a communication connection between the terminal device and a target device by connecting the first data screen mirroring application with a second data screen mirroring application; where the second data screen mirroring application is run on the target device;
transmitting a media-data obtaining instruction to the second data screen mirroring application through the first data screen mirroring application; where the second data screen mirroring application obtains first media data collected by a camera of the target device based on the received media-data obtaining instruction, and transmits the first media data to the first data screen mirroring application; and
transmitting the first media data to the conferencing application through the first data screen mirroring application so as to display a video frame corresponding to the first media data on the conferencing application.

In order to achieve the above technical purposes, according to the present disclosure, a data transmission system may further be provided, the data transmission system includes a terminal device and a target device;
on the terminal device, a conferencing application, a first data screen mirroring application, a virtual camera driver and a service module are run;

on the target device, a second data screen mirroring application is run;
the virtual camera driver is configured to transmit a data request instruction to the service module in response to selecting the virtual camera of the conferencing application; and
the service module is configured to start the first data screen mirroring application in response to the data request instruction;
the first data screen mirroring application is configured to establish a communication connection between the terminal device and the target device by connecting with the second data screen mirroring application;
the first data screen mirroring application is further configured to transmit a media-data obtaining instruction to the second data screen mirroring application;
the second data screen mirroring application is configured to obtain first media data collected by a camera of the target device based on the received media-data obtaining instruction, and transmit the first media data to the first data screen mirroring application; and
the first data screen mirroring application is further configured to transmit the first media data to the virtual camera driver so as to display a video frame corresponding to the first media data on the conferencing application.

In order to achieve the above technical purposes, according to the present disclosure, a data transmission method is further provided, which is applied to a first data screen mirroring application; the data transmission method includes:
establishing, by a first data screen mirroring application, a connection with a second data screen mirroring application so as to establish a communication connection between a terminal device and a target device; where the first data screen mirroring application is started after being controlled by a service module for responding to a data request instruction, the data request instruction is transmitted to the service module by a virtual camera driver for responding to selecting a virtual camera of a conferencing application, the conferencing application, the first data screen mirroring application, the virtual camera driver and the service module are run on the terminal device, and the second data screen mirroring application is run on the target device;
transmitting, by the first data screen mirroring application, a media-data obtaining instruction to the second data screen mirroring application; where the second data screen mirroring application is configured to obtain first media data collected by a camera of the target device based on the media-data obtaining instruction, and transmit the first media data to the first data screen mirroring application; and
transmitting, by the first data screen mirroring application, the received first media data to the virtual camera driver so as to display a video frame corresponding to the first media data on the conferencing application.

In order to achieve the above technical purposes, according to the present disclosure, a data transmission method may be further provided, which includes:
establishing, by a first data screen mirroring application, a connection with the second data screen mirroring application so as to establish a communication connection between the terminal device and the target device; where the first data screen mirroring application is started based on a selection of a virtual camera of a conferencing application, the conferencing application and the first data screen mirroring application are run on the terminal device, and the second data screen mirroring application is run on the target device;
transmitting, by the first data screen mirroring application, a media-data obtaining instruction to the second data screen mirroring application; where the second data screen mirroring application is configured to obtain first media data collected by a camera of the target device based on the media-data obtaining instruction, and transmit the first media data to the first data screen mirroring application; and
transmitting, by the first data screen mirroring application, the received first media data to the conferencing application so as to display a video frame corresponding to the first media data on the conferencing application.

In order to achieve the above technical purposes, according to the present disclosure, a data transmission system may be further provided, which includes a terminal device and a target device,
on the terminal device, a conferencing application and a first data screen mirroring application are run;
on the target device, a second data screen mirroring application is run;
the first data screen mirroring application is configured to be started based on a selection of a virtual camera of the conferencing application;
the first data screen mirroring application is further configured to establish a communication connection between the terminal device and the target device by connecting with the second data screen mirroring application;
the first data screen mirroring application is further configured to transmit a media-data obtaining instruction to the second data screen mirroring application;
the second data screen mirroring application is configured to obtain first media data collected by a camera of the target device based on the received media-data obtaining instruction, and transmit the first media data to the first data screen mirroring application; and
the first data screen mirroring application is further configured to transmit the first media data to the conferencing application so as to display a video frame corresponding to the first media data on the conferencing application.

In order to achieve the above technical purposes, according to the present disclosure, a data transmission device may be further provided, which includes a conferencing application and a first data screen mirroring application;
the first data screen mirroring application is configured to be started based on a selection of a virtual camera of the conferencing application;
the first data screen mirroring application is further configured to establish a communication connection between the terminal device and the target device by connecting with the second data screen mirroring application; the second data screen mirroring application is run on the target device;
the first data screen mirroring application is further configured to transmit a media-data obtaining instruction to the second data screen mirroring application; the second data screen mirroring application is configured to obtain first media data collected by a camera of the target device based on the received media-data obtaining instruction, and transmit the first media data to the first data screen mirroring application; and the first data screen mirroring application is further configured to transmit the first media data to the conferencing application so as to display a video frame corresponding to the first media data on the conferencing application.

In order to achieve the above technical purposes, according to the present disclosure, a data transmission device may be further provided, which is applied to a first data screen mirroring application; the data transmission device includes:

a connection establishing unit configured to establish a connection with a second data screen mirroring application so as to establish a communication connection between a terminal device and a target device; where the first data screen mirroring application is started after being controlled by a service module for responding to a data request instruction, the data request instruction is transmitted to the service module by a virtual camera driver for responding to a selection of a virtual camera of a conferencing application, the conferencing application, the first data screen mirroring application, the virtual camera driver and the service module are run on the terminal device, and the second data screen mirroring application is run on the target device;

an instruction transmitting unit configured to transmit a media-data obtaining instruction to the second data screen mirroring application; where the second data screen mirroring application is configured to obtain first media data collected by a camera of the target device based on the media-data obtaining instruction, and transmit the first media data to the first data screen mirroring application;

a data receiving unit configured to receive the first data screen mirroring application; and a data transmitting unit configured to transmit the received first media data to the virtual camera driver so as to display a video frame corresponding to the first media data on the conferencing application.

In order to achieve the above-mentioned technical purposes, according to the present disclosure, an electronic equipment may be further provided, which includes a memory and a processor, where the memory stores computer-readable instructions, and when the computer-readable instructions are executed by the processor, the processor executes steps of a data transmission method according to any embodiment of the present disclosure.

In order to achieve the above-mentioned technical purposes, according to the present disclosure, a storage medium may be further provided, which stores computer-readable instructions, when being executed by one or more processors, the computer-readable instructions enable the one or more processors to execute steps of a data transmission method according to any embodiment of the present disclosure.

The beneficial effects of the present disclosure include: compared with the problem in a conventional camera invoking solution that requires users to first open the data screen mirroring application and manually establish a connection between the terminal device and the tablet before the conferencing application can have a video frame, the present disclosure provides a convenient data transmission method, after a user opens the conferencing application and selects the virtual camera, the present disclosure can automatically establish a communication connection between the terminal device and the target device, and automatically provide the conferencing application with the first media data for forming a video frame, avoiding the problem that users often encounter in conventional solutions where the video frame is black after opening the conferencing application. It may be seen that the technical solution according to the present disclosure realizes automatic cross-device camera invoking in video conferencing scenes, simplifies user operations, significantly improves the video conferencing experience of users, and has high user satisfaction. In addition, the present disclosure can also make full use of the hardware performance advantages of the camera of the target device to provide better video effects for users participating in the video conferencing, thereby significantly improving the utilization rate of the camera of the target device.

DETAILED DESCRIPTION

Figure 1:
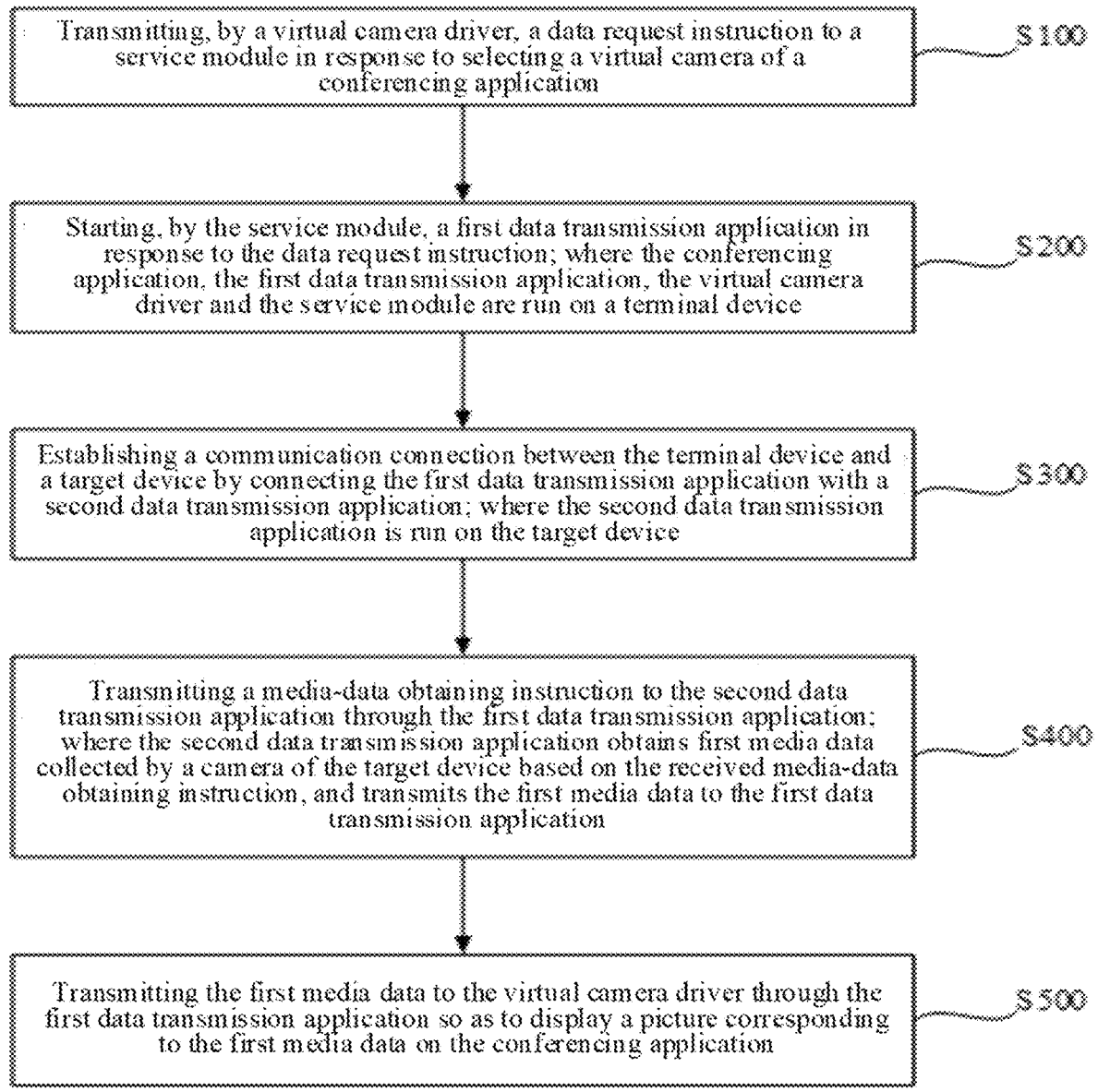
FIG. 1 is a schematic flowchart of a data transmission method according to one or more embodiments of the present disclosure.

The data transmission method, system, device, electronic equipment and storage medium according to embodiments of the present disclosure are explained and illustrated in detail below in conjunction with the drawings in the description.

In an embodiment of the present disclosure, a terminal device includes but is not limited to at least one of a laptop computer, a smart phone, a tablet computer, and a desktop computer. A conferencing application is, for example, conferencing software installed on the terminal device. A first data screen mirroring application is also installed on the terminal device and has a device synchronization function or a peripheral sharing function, and through this function, data collected by a camera of the target device may be obtained. The target device includes but is not limited to an intelligent interactive white board (for example, a conference board in a conference room) or other electronic equipment having a camera, and may have a built-in or external wide-angle, high-performance camera; a second data screen mirroring application is installed on a target device and also has a corresponding device synchronization function or a shared peripheral function. The terminal device and the target device may transmit and/or share data through the first data screen mirroring application and the second data screen mirroring application.

In a scene where a terminal device in a conference room conducts a video conferencing through a conferencing application, due to factors such as the wide angle of a camera in the terminal device and/or the captured image quality, it is sometimes necessary to invoke a video frame of an external device camera, such as a video frame collected by the camera of a conference board in the conference room, by a video frame screen mirroring application installed on the terminal device. Generally, the camera of a conference board has a wide angle and may collect the conference scene of the entire conference room (for example: the expressions and movements of all participants, items that need to be displayed during the conference, etc.), and in most cases, the camera of a conference board is often superior in performance to the camera of the terminal device of the user.

In the related art, in the above-mentioned conference scene, users of terminal devices often think of opening the conferencing application first out of habit, rather than opening the video frame screen mirroring application. Therefore, at this time, even if the user sets and selects a camera function in a conferencing application interface: virtual camera (also known as: Sharing Camera, that is, the virtual camera corresponding to the screen mirroring application, shown as FIG. 3), since there is no data in the cache corresponding to the virtual camera, the conferencing application displays a black video frame. This is because users are accustomed to opening the conferencing application to make a selection before the conference, rather than manually opening the video frame screen mirroring application on the terminal device and starting the device synchronization function or the shared peripheral function thereon. This results in the inability to establish a connection between the video frame screen mirroring application of the terminal device and the corresponding video frame screen mirroring application on the conference board, and then obtain the camera video frame of the conference board, nor can the video frame be loaded into the cache corresponding to the virtual camera. The conferencing application cannot read the corresponding data from the cache corresponding to the virtual camera. It may be seen that in the above usage scenes, the existing operations do not conform to the usage habits of the user, resulting in the black video frame that often appears in the terminal conferencing application causing trouble to the user, resulting in a poor user experience in the conference.

Based on the technical problems existing in the related art, a solution of the embodiment of the present disclosure is proposed.

At least one embodiment of the present disclosure provides a data transmission method to achieve convenient transmission of media data. The data transmission method includes but is not limited to the following steps: starting the first data screen mirroring application in response to a selection of a virtual camera of the conferencing application; where the conferencing application and the first data screen mirroring application are run on the terminal device; establishing a communication connection between the terminal device and the target device by connecting the first data screen mirroring application with the second data screen mirroring application; where the second data screen mirroring application is run on the target device; transmitting a media-data obtaining instruction to the second data screen mirroring application through the first data screen mirroring application; where the second data screen mirroring application obtains first media data collected by a camera of the target device based on the received media-data obtaining instruction, and transmitting the first media data to the first data screen mirroring application; and transmitting the first media data to the conferencing application through the first data screen mirroring application so as to display a video frame corresponding to the first media data on the conferencing application. It may be seen that the embodiment of the present disclosure realizes automatically starting the first data screen mirroring application after the user opens the conferencing application and selects the virtual camera, establishes a communication connection between the terminal device and the target device through the first data screen mirroring application and the second data screen mirroring application, and provides the conferencing application with the first media data (i.e., the data of the target device camera) for forming a video frame, avoiding the problem that the display video frame is black after the conferencing application is opened and the virtual camera is selected, which is often encountered by users in conventional solutions. It may be seen that the technical solution according to the present disclosure realizes automatic cross-device camera invoking in video conferencing scenes, simplifies user operations, significantly improves the video conferencing experience of users. The embodiments of the present disclosure make full use of the hardware performance advantages of the camera of the target device to provide better video effects for users participating in the video conferencing.

As shown in FIG. 1, according to one or more embodiments of the present disclosure, a data transmission method may be provided, which includes but is not limited to steps S100 to S500.

Step S100, transmitting, by a virtual camera driver, a data request instruction to a service module in response to selecting a virtual camera of a conferencing application.

Additionally, in response to selecting the virtual camera of the conferencing application, the virtual camera driver transmits a data request instruction to the service module, which may include: the conferencing application transmits a data request instruction to the virtual camera driver in response to selecting the virtual camera, and then the virtual camera driver forwards the data request instruction to a service module. The service module in this embodiment refers to a system service installed on the terminal device along with the installation of the first data screen mirroring application. The terminal device includes but is not limited to at least one of a laptop computer, a smart phone, a tablet computer and a desktop computer. The conferencing application is, for example, a conferencing software installed on the terminal device. The virtual camera driver is also installed on the terminal device along with the installation of the first data screen mirroring application, such as a Virtual Camera driver, etc., which is not specifically limited herein. As the terminal device starts running, the virtual camera driver and the service module both run automatically in the background, and the service module automatically establishes a connection with the virtual camera driver. The virtual camera driver in the embodiment of the present disclosure is located in a driver layer of the terminal device, and the service module and the first data screen mirroring application may be connected to the virtual camera driver through a local port and a local address (for example, 127.0.0.1) of the driver layer.

Step S200, starting, by the service module, a first data screen mirroring application in response to the data request instruction; where the conferencing application, the first data screen mirroring application, the virtual camera driver and the service module are run on a terminal device.

Additionally, according to the embodiment of the present disclosure, the manner in which the service module responds to the data request instruction may include: using ShellExecute (an application program interface function for controlling the opening of an external program) to automatically open the first data screen mirroring application, but is certainly not limited thereto.

Step S300: establishing a communication connection between the terminal device and a target device by connecting the first data screen mirroring application with a second data screen mirroring application; where the second data screen mirroring application is run on the target device.

Additionally, a communication connection between the terminal device and the target device is established by connecting the first data screen mirroring application with the second data screen mirroring application. The following manner may be used: manually enter a connection code in the interface of the first data screen mirroring application, or select from the connectable devices displayed and searched on the interface. If there is only one connectable device, the connectable device may also be connected automatically; if the device displayed on the interface has been connected in the historical record, the historical connection time may also be displayed at the same time; there may be other manners, not limited to these. Through the above method, the first data screen mirroring application may obtain address (IP, Internet Protocol) information and port (Port) information from the second data screen mirroring application so as to establish a communication connection between the terminal device and the target device through the Transmission Control Protocol (TCP) based on the address information and port information. The first data screen mirroring application in the embodiments of the present disclosure may be a data screen mirroring application client (Client), and the second data screen mirroring application may be a data screen mirroring application server (Server). The data screen mirroring application may be an application with device synchronization function or peripheral sharing function, including but not limited to video frame screen mirroring application.

Step S400, transmitting a media-data obtaining instruction to the second data screen mirroring application through the first data screen mirroring application; where the second data screen mirroring application obtains first media data collected by a camera of the target device based on the received media-data obtaining instruction, and transmits the first media data to the first data screen mirroring application.

Additionally, the transmitting a media-data obtaining instruction to the second data screen mirroring application through the first data screen mirroring application includes: after step S300, starting automatically, by the first data screen mirroring application, a device synchronization function or a peripheral sharing function, and transmitting a media-data obtaining instruction to the second data screen mirroring application. In response to the received media-data obtaining instruction, the second data screen mirroring application may pop up a dialog window on the video frame of the target device, and the participant may choose to agree or refuse the terminal device to invoke the camera of the target device through an agreement option and/or disagreement option in the dialog window. In response to the operation of the user on the agreement option, the second data screen mirroring application may transmit an instruction to collect the first media data to the camera of the target device based on the media-data obtaining instruction. The camera of the target device transmits the first media data to the second data screen mirroring application in response to the instruction. The second data screen mirroring application compresses and encodes the first media data and transmits it to the first data screen mirroring application. In some implementations, the video data collected by the camera of the target device may be in RGB format, and may be compressed after being encoded by the second data screen mirroring application to obtain video data in H264 format. On the contrary, in response to the operation of the user on the disagreement option, the second data screen mirroring application no longer performs the corresponding operation. In addition, in an embodiment of the present disclosure, a default agreement option is set in the configuration of the second data screen mirroring application to allow the terminal device to invoke the camera of the target device by default.

Step S500: transmitting the first media data to the virtual camera driver through the first data screen mirroring application so as to display a video frame corresponding to the first media data on the conferencing application.

Additionally, the first media data, for example, may be a data stream in H264 (Highly Compression Digital Video Codec Standard) format acquired by compression after encoding by the second data screen mirroring application, and the first media data may be decoded by FFmpeg (a multimedia video processing tool with video format conversion function) to decode data stream in H264 format into data stream in YUV (a format that may be used to record color images) format. The decoding process may further include converting data stream in YUV format into data stream in RGB24 (24-bit RGB) format through libyuv (a video format conversion tool) to obtain decoded second media data. In the process of decoding the first media data by the first data screen mirroring application in this embodiment, data conversion may be performed based on the format requirements of the video length, video width, and video size contained in the data request instruction to acquire the second media data. The embodiment of the present disclosure stores the second media data in a storage space (Buffer, i.e., the cache of the virtual camera driver) pre-allocated for the virtual camera module in the driver layer, and the conferencing application obtains the second media data from Buffer and uses the obtained second media data to form a video frame.

In summary, according to the embodiments of the present disclosure, after the user opens the conferencing application on the terminal device and selects the virtual camera, with the support of the camera driver and service module, the first data screen mirroring application and its device synchronization function or shared peripheral function can be automatically started, and then a communication connection can be established with the second data screen mirroring application of the target device to obtain the media data collected by the camera of the target device, so that the conferencing application can automatically invoke and display the media data collected by the camera of the external target device, avoiding the problem in the related art that the operation is complicated, does not conform to user habits, and often causes the video frame to be black after the user opens the conferencing application and selects Sharing Camera, causing trouble and inconvenience to the user. This application automatically starts the first data screen mirroring application and its functions in response to Sharing Camera selection of the conferencing application, thereby simplifying the manual operation of the user, making the entire process more in line with user habits, and improving the video conferencing experience and satisfaction of the user; in addition, it also significantly improves the utilization rate of the camera of the target device.

In one or more embodiments of the present disclosure, the data transmission method further includes: before starting, by the service module, the first data screen mirroring application, or before receiving, by the first data screen mirroring application, the first media data, transmitting, by the service module, a preset image to the virtual camera driver so as to display a video frame corresponding to the preset image on the conferencing application.

Additionally, as the terminal device starts running, the virtual camera driver and the service module both automatically run in the background, and the service module automatically establishes a connection with the virtual camera driver. The virtual camera driver is located in the driver layer of the terminal device, and the service module may be connected with the virtual camera driver through the local port and local address (such as 127.0.0.1) of the driver layer. Then, the service module transmits a verification data packet to the virtual camera driver; the verification data packet is verified by the virtual camera driver; if the verification passes, the virtual camera driver transmits a first response instruction (an instruction indicating that the verification is successful) to the service module; the first response instruction indicates that the service module has the authority to write data to the virtual camera driver; if the verification fails, the virtual camera driver transmits a second response instruction (an instruction indicating that the verification fails) to the service module through the virtual camera driver; the second response instruction indicates that the service module does not have the authority to write data to the virtual camera driver. At the same time, the service module saves preset images. If the verification is successful, the service module writes the data of the preset image into the storage space allocated by the virtual camera module (Buffer, that is, the cache driven by the virtual camera). When the conferencing application selects Sharing Camera, the data of the preset image may be obtained from Buffer, and the video frame may be formed using the obtained data of the preset image. The preset image encoding may be, for example, a data stream in RGB24 (24-bit RGB) format, thereby forming a video frame on the interface of the conferencing application. In one or more embodiments of the present disclosure, the preset image has text information for guiding user operations and/or graphic information for guiding user operations. For example, the text information may be a text introduction guiding the user to download and/or use the video frame screen mirroring application, and the graphic information may be an operation diagram guiding the user to download and/or use the video frame screen mirroring application. Based on the above-mentioned scheme, the embodiments of the present disclosure may guide the user to perform corresponding operations through preset images when the first media data is not successfully acquired. For example, the user may be informed to manually establish a connection between the terminal device and the target device by entering a PIN code (a connection code), and/or, the device synchronization function or the shared peripheral function of the first data screen mirroring application (i.e., the data screen mirroring application client (Client)) interface may be manually started. The device synchronization function or the shared peripheral function includes but is not limited to: the client of the data screen mirroring application obtains the video data collected by the camera of the data screen mirroring application server based on the above-mentioned connection. This embodiment improves the reliability of accessing the virtual camera driver based on the above method, and ensures that the data written into the virtual camera driver is the media data to be used in the embodiment of the present disclosure. At the same time, it solves the problem that before the data collected by the camera of the target device is obtained through the first data screen mirroring application, the terminal device displays a black video frame after selecting Sharing Camera option in the conferencing application interface, which causes trouble to users, thereby improving the conferencing experience and satisfaction of the user.

In one or more embodiments of the present disclosure, the data transmission method further includes: when receiving, by the first data screen mirroring application, the first media data, transmitting, by the first data screen mirroring application, a disconnect instruction to the service module; after receiving, by the service module, the disconnect instruction, the service module responds to the disconnect instruction, specifically disconnects the connection with the virtual camera driver to stop transmitting the preset image to the virtual camera driver, and then the first data screen mirroring application transmits the processed first media data to the virtual camera driver, thereby satisfying the requirement of the terminal device conferencing application to use the camera of the target device.

In one or more embodiments of the present disclosure, before transmitting the first media data to the virtual camera driver through the first data screen mirroring application, the method further includes: establishing, by the first data screen mirroring application, a connection with the virtual camera driver through the local port and the local address of the driver layer; then, transmitting a verification data packet to the virtual camera driver through the first data screen mirroring application; verifying the verification data packet through the virtual camera driver; if the verification passes, issuing a first response instruction (indicating that the verification is successful) to the first data screen mirroring application through the virtual camera driver; where the first response instruction indicates that the first data screen mirroring application has permission to write data to the virtual camera driver; if the verification fails, issuing a second response instruction (indicating that the verification fails) to the first data screen mirroring application through the virtual camera driver; where the second response instruction indicates that the first data screen mirroring application does not have permission to write data to the virtual camera driver. This embodiment can improve the reliability of accessing the virtual camera driver in the above manner, avoid applications that fail verification from writing data to the virtual camera driver, and ensure that the data written to the virtual camera driver is the media data to be used in the embodiment of the present disclosure.

In one or more embodiments of the present disclosure, the verifying the verification data packet through the virtual camera driver includes: parsing the verification data packet through the virtual camera driver to parse out a process identifier (ID); checking whether the process identifier is the process identifier of an application layer on the terminal device, and specifically determining whether the process identifier exists in the process list of the terminal device; if so, confirming that the verification passes, indicating that the first data screen mirroring application is an application running on the application layer of the terminal device; if not, confirming that the verification fails, indicating that the first data screen mirroring application is not an application running on the application layer of the terminal device. Based on the above improved technical solution, the embodiment of the present disclosure can also prevent non-application layer programs or applications from accessing the driver layer, thereby improving the security of the embodiment of the present disclosure.

In an embodiment of the present disclosure, the establishing a communication connection between the terminal device and a target device by connecting the first data screen mirroring application with a second data screen mirroring application includes: if the number of target devices is one, establishing a communication connection between the terminal device and the current target device by connecting the first data screen mirroring application with the second data screen mirroring application on the current target device; and if the number of target devices is multiple, confirming a target device to be connected based on the selection of a user or device connection history information, and establishing a communication connection between the terminal device and the target device to be connected by connecting the first data screen mirroring application with the second data screen mirroring application on the target device to be connected. According to this embodiment, the confirming the target device to be connected based on the device selection includes: displaying a list of all searched target devices in the first data screen mirroring application interface, and confirming the target device corresponding to the device selection as the target device to be connected in response to the device selection of the user based on click or touch. According to this embodiment, the manner of searching the target device includes searching the target device in the current local area network based on Simple Service Discovery Protocol (SSDP), and adding the searched target device to the list. The confirming the target device to be connected based on device connection history information may be: the history information includes information of the target device connected last time, and the current connection automatically connects to the device connected last time. The embodiment of the present disclosure can meet the user requirement for quickly connecting to the target device based on the above-mentioned solution, meet the user requirement for invoking the camera of the required target device, and improve user satisfaction. The embodiments of the present disclosure not only significantly improve the operating efficiency of the user, but also provide the user with multiple target devices to choose from. The user only needs to log in to the account of the conferencing application on the terminal device, and can use the camera of the target device without logging in to the account of the conferencing application on the target device, thereby improving the account security of the conferencing application and enhancing the user experience.

Figure 3:
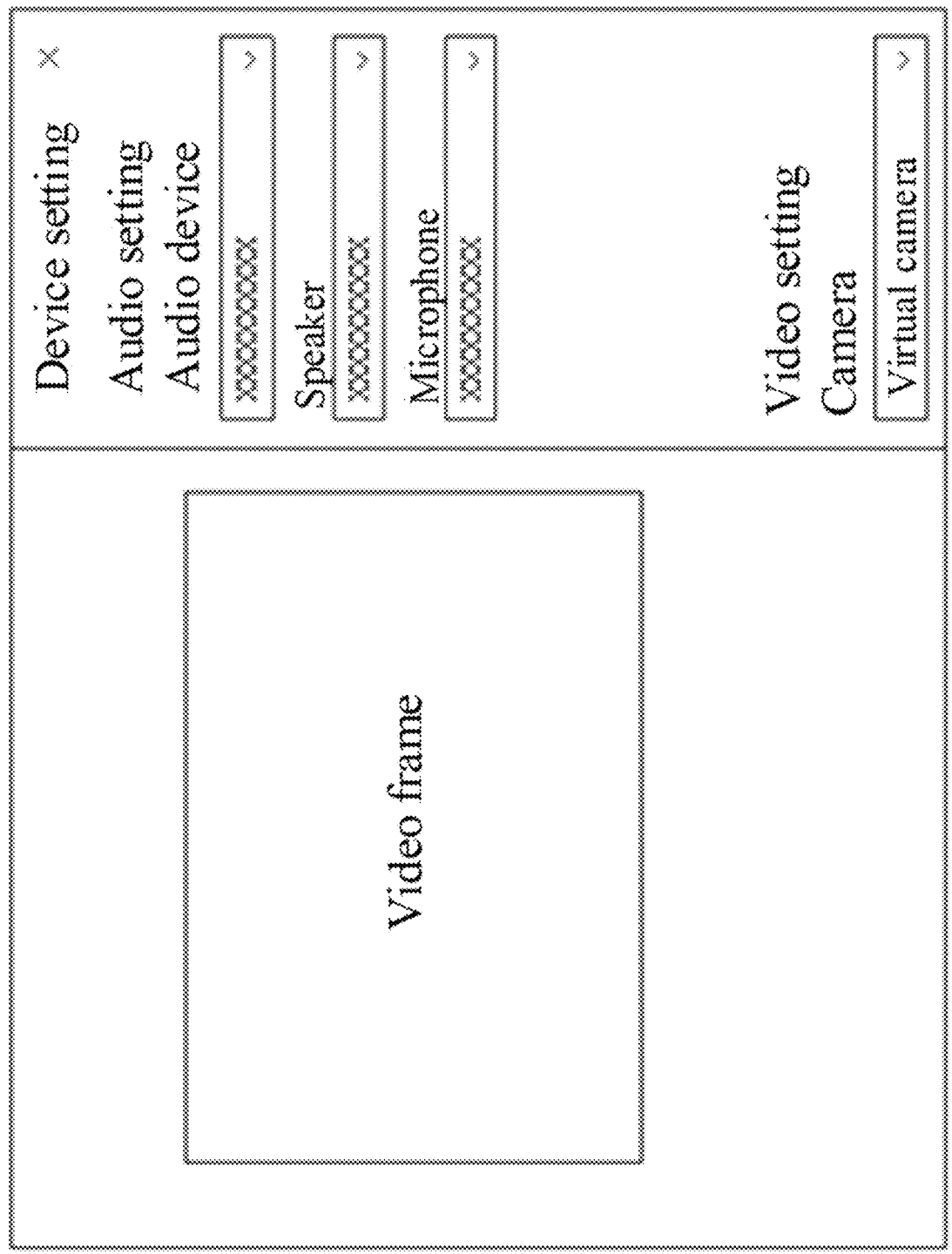
FIG. 3 shows a schematic diagram of a conferencing application displayed on a video frame of a terminal device according to one or more embodiments of the present disclosure.

As shown in FIG. 3, the conferencing application may have a device setting option (the x on the right is used to turn off the option). Audio and video settings may be performed under the device setting option. The audio setting may include, for example, the selection setting of audio equipment, speakers, and microphones. In combination with the video setting of the embodiment of the present disclosure, the corresponding virtual camera may be selected in the camera option (including the virtual camera option). After clicking on the option, the first data screen mirroring application and the device synchronization function will be automatically turned on. After successfully obtaining the data from the target device camera, it will be written into the storage space allocated by the virtual camera module (Buffer, i.e., the cache driven by the virtual camera). At this time, the video frame displayed by the conferencing application is the video frame corresponding to the virtual camera module. This example is a schematic interface of a certain conferencing application, but is certainly not limited to this.

Figure 2:
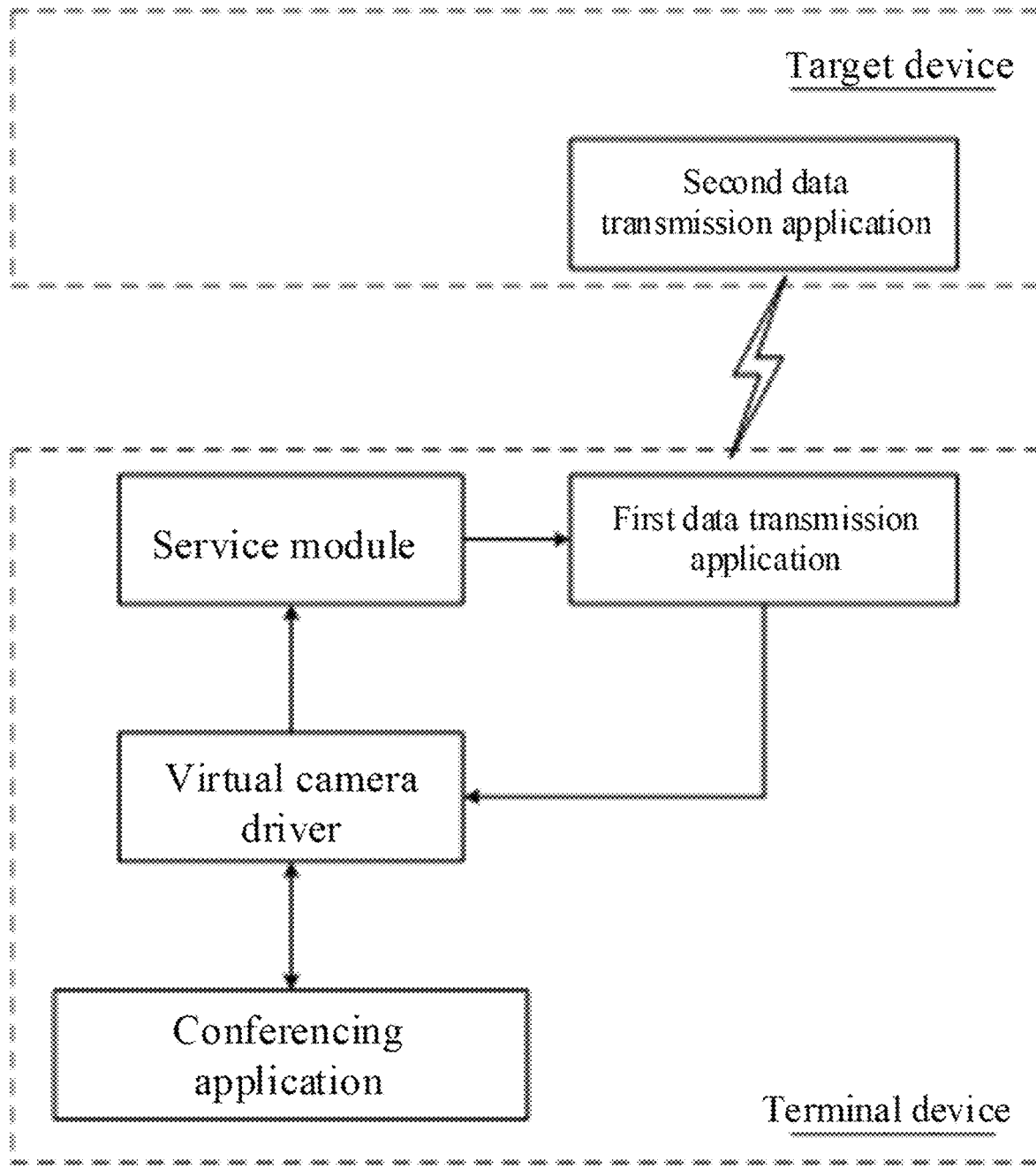
FIG. 2 is a schematic diagram showing a structure of a data transmission system according to one or more embodiments of the present disclosure.

As shown in FIG. 2, one or more embodiments of the present disclosure may further provide a data transmission system, which includes a terminal device and a target device.

On the terminal device, a conferencing application, a first data screen mirroring application, a virtual camera driver and a service module are run.

On the target device, a second data screen mirroring application is run.

The virtual camera driver is configured to transmit a data request instruction to the service module in response to selecting the virtual camera of the conferencing application.

The service module is configured to start the first data screen mirroring application in response to the data request instruction.

The first data screen mirroring application is configured to establish a communication connection between the terminal device and the target device by connecting with the second data screen mirroring application.

The first data screen mirroring application is further configured to transmit a media-data obtaining instruction to the second data screen mirroring application.

The second data screen mirroring application is configured to obtain first media data collected by a camera of the target device based on the received media-data obtaining instruction, and transmit the first media data to the first data screen mirroring application.

The first data screen mirroring application is further configured to transmit the first media data to the virtual camera driver so as to display a video frame corresponding to the first media data on the conferencing application.

In some implementations, the service module is further configured to transmit a preset image to the virtual camera driver through the service module before the first data screen mirroring application is started or before the first data screen mirroring application receives the first media data, so as to display a video frame corresponding to the preset image on the conferencing application.

In some implementations, the first data screen mirroring application is configured to transmit a disconnect instruction to the service module when receiving, by the first data screen mirroring application, the first media data; the service module is configured to in response to the disconnect instruction, disconnect with the virtual camera driver to stop transmitting the preset image to the virtual camera driver, and then the first data screen mirroring application transmits the first media data to the virtual camera driver.

In some implementations, the first data screen mirroring application may process the first media data to obtain second media data, and transmit the second media data to the virtual camera driver. Additionally, it may be as follows: the first media data in the embodiment of the present disclosure is, for example, a data stream in H264 (Highly Compressed Digital Video Codec Standard) format. The first data screen mirroring application may decode the first media data through FFmpeg (a multimedia video processing tool with video format conversion function) to decode the data stream in H264 format into a data stream in YUV (a format that may be used to record color images) format. The decoding process may further include converting data stream in YUV format into data stream in RGB24 (24-bit RGB) format through libyuv (a video format conversion tool) to obtain decoded second media data. During specific implementation, the video data collected by the camera of the target device may be in RGB format, and after format conversion by the target device, the video data in H264 format is obtained, that is, the first media data. In addition, in the process of decoding the first media data by the first data screen mirroring application, data conversion may be performed based on the format requirements of the video length, video width, and video size contained in the data request instruction to acquire the second media data.

In some implementations, the preset image has text information for guiding user operations and/or graphic information for guiding user operations.

In some implementations, the first data screen mirroring application is configured to transmit a verification data packet to the virtual camera driver; the virtual camera driver is configured to verify the verification data packet; the virtual camera driver is configured to send a first response instruction to the first data screen mirroring application if the verification passes; the first response instruction indicates that the first data screen mirroring application has permission to write data to the virtual camera driver; the virtual camera driver is configured to send a second response instruction to the first data screen mirroring application if the verification fails; the second response instruction indicates that the first data screen mirroring application does not have permission to write data to the virtual camera driver.

In some implementations, the virtual camera driver is configured to parse the verification data packet to parse out a process identifier; the virtual camera driver is configured to check whether the process identifier is the process identifier of the application layer on the terminal device, if so, confirm that the verification passes; if not, confirm that the verification fails.

In some implementations, the first data screen mirroring application is configured to establish a communication connection between the terminal device and the current target device by connecting the first data screen mirroring application with the second data screen mirroring application on the current target device if the number of target devices is one; the first data screen mirroring application is configured to confirm the target device to be connected based on device selection or device connection history information if the number of target devices is multiple, and establish a communication connection between the terminal device and the target device to be connected by connecting the first data screen mirroring application with the second data screen mirroring application on the target device to be connected.

In some implementations, the terminal device includes at least one of a laptop computer, a smart phone, a tablet computer and a desktop computer; the target device includes an intelligent interactive white board or an electronic equipment having a camera.

Figure 4:
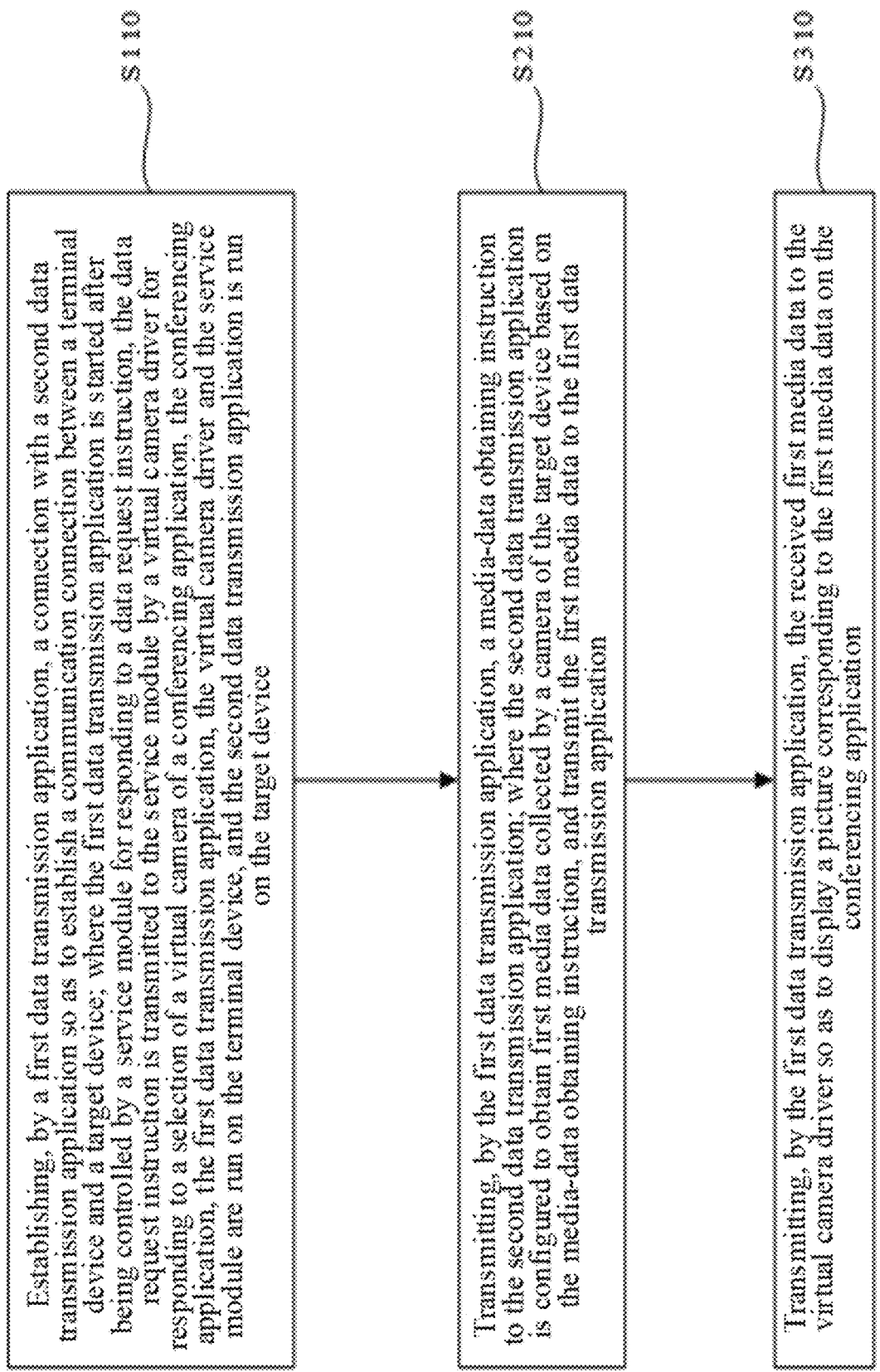
FIG. 4 is a schematic flowchart of another data transmission method according to one or more embodiments of the present disclosure.

As shown in FIG. 4, one or more embodiments of the present disclosure may further provide a data transmission method, which is applied to a first data screen mirroring application.

The data transmission method includes but is not limited to steps S110 to S310.

Step S110, establishing, by a first data screen mirroring application, a connection with a second data screen mirroring application so as to establish a communication connection between a terminal device and a target device; where the first data screen mirroring application is started after being controlled by a service module for responding to a data request instruction, the data request instruction is transmitted to the service module by a virtual camera driver for responding to selecting a virtual camera of a conferencing application, the conferencing application, the first data screen mirroring application, the virtual camera driver and the service module are run on the terminal device, and the second data screen mirroring application is run on the target device.

Step S210, transmitting, by the first data screen mirroring application, a media-data obtaining instruction to the second data screen mirroring application; where the second data screen mirroring application is configured to obtain first media data collected by a camera of the target device based on the media-data obtaining instruction, and transmit the first media data to the first data screen mirroring application.

Step S310, transmitting, by the first data screen mirroring application, the received first media data to the virtual camera driver so as to display a video frame corresponding to the first media data on the conferencing application.

In some implementations, before the service module starts the first data screen mirroring application, or before the first data screen mirroring application receives the first media data, the preset image is transmitted to the virtual camera driver through the service module so as to display a video frame corresponding to the preset image on the conferencing application.

In some implementations, the data transmission method further includes: when the first data screen mirroring application receives the first media data, the first data screen mirroring application transmits a disconnect instruction to the service module; the service module responds to the disconnect instruction, disconnects the connection with the virtual camera driver to stop transmitting the preset image to the virtual camera driver, and then the first data screen mirroring application transmits the first media data to the virtual camera driver.

In some implementations, the first data screen mirroring application may process the first media data to obtain second media data, and transmit the second media data to the virtual camera driver. Additionally, it may be as follows: the first media data in the embodiment of the present disclosure is, for example, a data stream in H264 (Highly Compressed Digital Video Codec Standard) format. The first data screen mirroring application may decode the first media data through FFmpeg (a multimedia video processing tool with video format conversion function) to decode the data stream in H264 format into a data stream in YUV (a format that may be used to record color images) format. The decoding process may further include converting data stream in YUV format into data stream in RGB24 (24-bit RGB) format through libyuv (a video format conversion tool) to obtain decoded second media data. During some implementations, the video data collected by the camera of the target device may be in RGB format, and after format conversion by the target device, the video data in H264 format is obtained, that is, the first media data. In addition, in the process of decoding the first media data by the first data screen mirroring application, data conversion may be performed based on the format requirements of the video length, video width, and video size contained in the data request instruction to acquire the second media data.

In some implementations, the preset image has text information for guiding user operations and/or graphic information for guiding user operations.

In some implementations, before transmitting the first media data to the virtual camera driver through the first data screen mirroring application, the method further includes: transmitting a verification data packet to the virtual camera driver through the first data screen mirroring application; verifying the verification data packet through the virtual camera driver; if the verification passes, issuing a first response instruction to the first data screen mirroring application through the virtual camera driver; where the first response instruction indicates that the first data screen mirroring application has permission to write data to the virtual camera driver; if the verification fails, issuing a second response instruction to the first data screen mirroring application through the virtual camera driver; where the second response instruction indicates that the first data screen mirroring application does not have the permission to write data to the virtual camera driver.

In some implementations, the verifying the verification data packet through the virtual camera driver includes: parsing the verification data packet through the virtual camera driver to parse out a process identifier; checking whether the process identifier is the process identifier of the application layer on the terminal device, and if so, confirming that the verification passes; if not, confirming that the verification fails.

In some implementations, the establishing a communication connection between the terminal device and a target device by connecting the first data screen mirroring application with a second data screen mirroring application includes: if the number of target devices is one, establishing a communication connection between the terminal device and the current target device by connecting the first data screen mirroring application with the second data screen mirroring application on the current target device; and if the number of target devices is multiple, confirming a target device to be connected based on the selection of a user or device connection history information, and establishing a communication connection between the terminal device and the target device to be connected by connecting the first data screen mirroring application with the second data screen mirroring application on the target device to be connected.

At least one embodiment of the present disclosure may further provide a data transmission method, and the executor of the data transmission method may be a terminal device. The data transmission method includes: establishing, by a first data screen mirroring application, a connection with a second data screen mirroring application so as to establish a communication connection between a terminal device and a target device; where the first data screen mirroring application is started after being controlled by a service module for responding to a data request instruction, the data request instruction is transmitted to the service module by a virtual camera driver for responding to selecting a virtual camera of a conferencing application, the conferencing application, the first data screen mirroring application, the virtual camera driver and the service module are run on the terminal device, and the second data screen mirroring application is run on the target device; transmitting, by the first data screen mirroring application, a media-data obtaining instruction to the second data screen mirroring application; where the second data screen mirroring application is configured to obtain first media data collected by a camera of the target device based on the media-data obtaining instruction, and transmit the first media data to the first data screen mirroring application; and transmitting, by the first data screen mirroring application, the received first media data to the virtual camera driver so as to display a video frame corresponding to the first media data on the conferencing application.

As shown in FIG. 2, the embodiment of the present disclosure may further provide a data transmission system, which includes a terminal device and a target device.

On the terminal device, a conferencing application and a first data screen mirroring application are run.

On the target device, a second data screen mirroring application is run.

The first data screen mirroring application is configured to be started based on a selection of a virtual camera of the conferencing application. In some embodiments, a virtual camera driver and a service module are run on the terminal device. The virtual camera driver of this embodiment is configured to transmit a data request instruction to a service module in response to selecting a virtual camera of a conferencing application; the service module is configured to start a first data screen mirroring application in response to the data request instruction.

The first data screen mirroring application is further configured to establish a communication connection between the terminal device and the target device by connecting with the second data screen mirroring application.

The first data screen mirroring application is further configured to transmit a media-data obtaining instruction to the second data screen mirroring application.

The second data screen mirroring application is configured to obtain first media data collected by a camera of the target device based on the received media-data obtaining instruction, and transmit the first media data to the first data screen mirroring application.

The first data screen mirroring application is further configured to transmit the first media data to the conferencing application so as to display a video frame corresponding to the first media data on the conferencing application. In some embodiments, the first data screen mirroring application is further configured to transmit the first media data to the virtual camera driver so as to display a video frame corresponding to the first media data on the conferencing application.

At least one embodiment of the present disclosure may further provide a data transmission device. The data transmission device includes a conferencing application and a first data screen mirroring application; the first data screen mirroring application is further configured to establish a communication connection between the terminal device and the target device by connecting with the second data screen mirroring application; the second data screen mirroring application is run on the target device; the first data screen mirroring application is further configured to transmit a media-data obtaining instruction to the second data screen mirroring application; the second data screen mirroring application is configured to obtain first media data collected by a camera of the target device based on the received media-data obtaining instruction, and transmit the first media data to the first data screen mirroring application; the first data screen mirroring application is further configured to transmit the first media data to the conferencing application so as to display a video frame corresponding to the first media data on the conferencing application.

Figure 5:
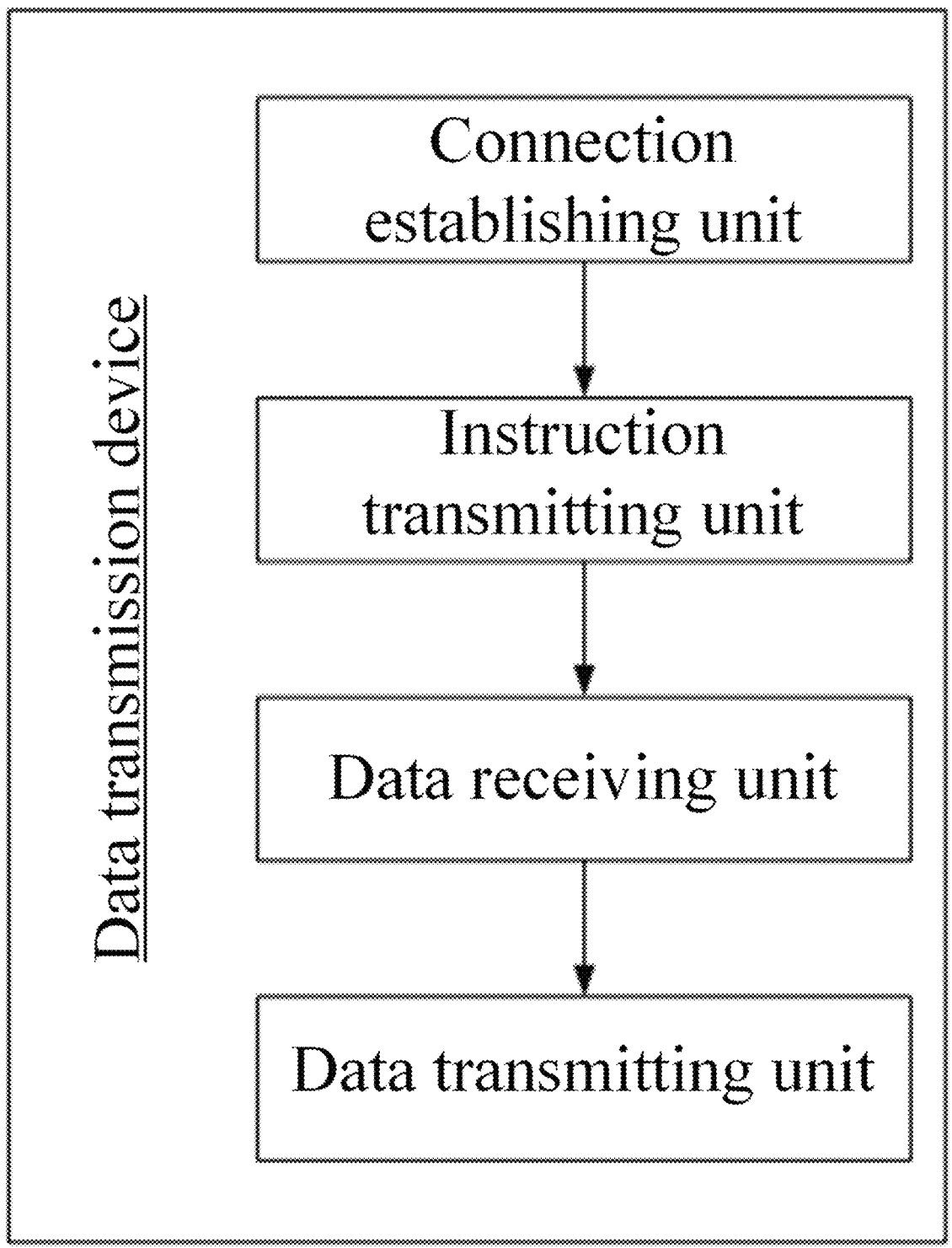
FIG. 5 is a schematic diagram showing a structure of a data transmission device according to one or more embodiments of the present disclosure.

As shown in FIG. 5, one or more embodiments of the present disclosure may further provide a data transmission device. The data transmission device is applied to a first data screen mirroring application.

The data transmission device includes but is not limited to a connection establishing unit, an instruction transmitting unit, a data receiving unit and a data transmitting unit.

The connection establishment unit is configured to establish a connection with a second data screen mirroring application so as to establish a communication connection between a terminal device and a target device; where the first data screen mirroring application is started after being controlled by a service module for responding to a data request instruction, the data request instruction is transmitted to the service module by a virtual camera driver for responding to a selection of a virtual camera of a conferencing application, the conferencing application, the first data screen mirroring application, the virtual camera driver and the service module are run on the terminal device, and the second data screen mirroring application is run on the target device.

The instruction transmitting unit is configured to transmit a media-data obtaining instruction to the second data screen mirroring application; where the second data screen mirroring application is configured to obtain first media data collected by a camera of the target device based on the media-data obtaining instruction, and transmit the first media data to the first data screen mirroring application.

The data receiving unit is configured to receive the first data screen mirroring application.

The data transmitting unit is configured to transmit the received first media data to the virtual camera driver so as to display a video frame corresponding to the first media data on the conferencing application.

In some implementations, the service module is further configured to transmit a preset image to the virtual camera driver through the service module before the first data screen mirroring application is started or before the first data screen mirroring application receives the first media data, so as to display a video frame corresponding to the preset image on the conferencing application.

In some implementations, the first data screen mirroring application is configured to transmit a disconnect instruction to the service module when receiving, by the first data screen mirroring application, the first media data; the service module is configured to in response to the disconnect instruction, disconnects with the virtual camera driver to stop transmitting the preset image to the virtual camera driver, and then the first data screen mirroring application transmits the first media data to the virtual camera driver.

In some implementations, the preset image has text information for guiding user operations and/or graphic information for guiding user operations.

In some implementations, the first data screen mirroring application is configured to transmit a verification data packet to the virtual camera driver; the virtual camera driver is configured to verify the verification data packet; the virtual camera driver is configured to send a first response instruction to the first data screen mirroring application if the verification passes; the first response instruction indicates that the first data screen mirroring application has permission to write data to the virtual camera driver; the virtual camera driver is configured to send a second response instruction to the first data screen mirroring application if the verification fails; the second response instruction indicates that the first data screen mirroring application does not have permission to write data to the virtual camera driver.

In some implementations, the virtual camera driver is configured to parse the verification data packet to parse out a process identifier; the virtual camera driver is configured to check whether the process identifier is the process identifier of the application layer on the terminal device, if so, confirm that the verification passes; if not, confirm that the verification fails.

In some implementations, the first data screen mirroring application is configured to establish a communication connection between the terminal device and the current target device by connecting the first data screen mirroring application with the second data screen mirroring application on the current target device if the number of target devices is one; the first data screen mirroring application is configured to confirm the target device to be connected based on device selection or device connection history information if the number of target devices is multiple, and establish a communication connection between the terminal device and the target device to be connected by connecting the first data screen mirroring application with the second data screen mirroring application on the target device to be connected.

In some implementations, the terminal device includes at least one of a laptop computer, a smart phone, a tablet computer and a desktop computer; the target device includes an intelligent interactive white board or an electronic equipment having a camera.

In summary, after a user opens the conferencing application and selects the virtual camera, the present disclosure can automatically establish a communication connection between the terminal device and the target device, and automatically provide the conferencing application with the first media data for forming a video frame, avoiding the problem that users often encounter in conventional solutions where the video frame is black after opening the conferencing application. It may be seen that the technical solution according to the present disclosure realizes automatic cross-device camera invoking in video conferencing scenes, simplifies user operations, significantly improves the video conferencing experience of users, and has high user satisfaction. In addition, the present disclosure can also make full use of the hardware performance advantages of the camera of the target device to provide better video effects for users participating in the video conferencing, thereby significantly improving the utilization rate of the camera of the target device.

Figure 6:
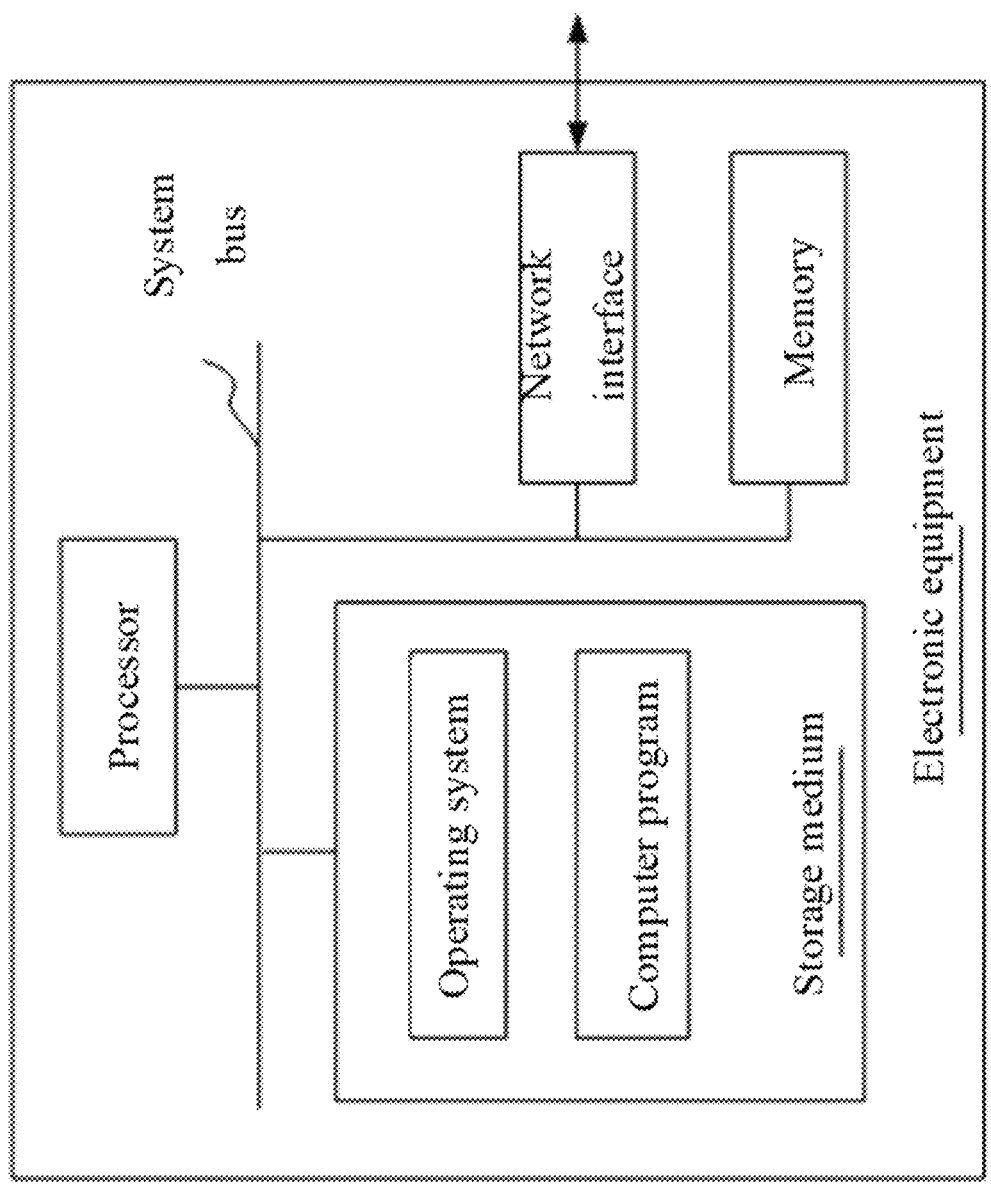
FIG. 6 is a schematic diagram showing the internal structure of an electronic equipment according to one or more embodiments of the present disclosure.

As shown in FIG. 6, one or more embodiments of the present disclosure may further provide an electronic equipment, which includes a memory and a processor. The memory stores computer-readable instructions, when the computer-readable instructions are executed by the processor, the processor executes steps of a data transmission method according to any embodiment of the present disclosure. The detailed implementation process of the data transmission method according to the embodiments of the present disclosure has been described in detail in this description, and will not be repeated here.

As shown in FIG. 6, one or more embodiments of the present disclosure may further provide a storage medium storing computer-readable instructions. When being executed by one or more processors, the computer-readable instructions enable the one or more processors to execute steps of a data transmission method according to any embodiment of the present disclosure. The detailed implementation process of the data transmission method according to the embodiments of the present disclosure has been described in detail in this description, and will not be repeated here.

The logic and/or steps represented in a flowchart or otherwise described herein, such as a sequential list of executable instructions used to implement logical functions, may be implemented in any computer-readable storage medium for use by instruction execution systems, devices, or equipment (such as computer-based systems, systems including processors, or other systems that may fetch and execute instructions from instruction execution systems, devices, or equipment), or used in conjunction with these instruction execution systems, devices, or equipment. For the purpose of this description, "computer-readable storage medium" may be any device that may contain, store, communicate, disseminate, or transmit programs for use in instruction execution systems, devices, or equipment, or in conjunction with such instruction execution systems, devices, or equipment. More examples (non-exhaustive list) of computer-readable storage media include electrical connections (electronic equipment) with one or more wiring, portable computer enclosures (magnetic devices), Random Access Memory (RAM), Read-Only Memory (ROM), Erasable Programmable Read-Only Memory (EPROM), fiber optic devices, and Compact Disc Read-Only Memory (CDROM). In addition, computer-readable storage media may even be paper or other suitable media on which the program may be printed, as the program may be electronically obtained, for example, by optical scanning of paper or other media, followed by editing, interpretation, or necessary processing in other suitable ways, and then stored in computer memory.

It should be understood that the various parts of the present disclosure may be implemented using hardware, software, firmware, or a combination thereof. In the above embodiments, multiple steps or methods may be implemented using software or firmware stored in memory and executed by a suitable instruction execution system. For example, if implemented in hardware, as in another implementation, any one or a combination of the following techniques known in the art may be used: discrete logic circuits with logic gate circuits for implementing logic functions on data signals, application specific integrated circuits with suitable combinational logic gate circuits, Programmable Gate Array (PGA), Field Programmable Gate Array (FPGA), etc.

In the description of this specification, the reference to the terms "this embodiment", "one embodiment," "some embodiments," "examples," "specific examples," or "some examples" means that the specific features, structures, materials, or characteristics described in conjunction with the embodiment or example are included in at least one embodiment or example of this application. In this description, the schematic expressions of the above terms do not necessarily refer to the same embodiments or examples. Moreover, the specific features, structures, materials, or characteristics described may be combined in any one or more embodiments or examples in an appropriate manner. In addition, those in the art may integrate and combine the different embodiments or examples described in this description, as well as the features of different embodiments or examples, without conflicting with each other.

In addition, the terms "first" and "second" are only used for descriptive purposes and cannot be understood as indicating or implying relative importance or implying the number of technical features indicated. Therefore, the features that are limited to "first" and "second" may explicitly or implicitly include at least one of these features. In the description of the present disclosure, "multiple" means at least two, such as two, three, etc., unless otherwise specified.

The above embodiments of the present disclosure are exemplary and not intended to limit the present disclosure. Any modifications, equivalent substitutions, or simple improvements made to the substantive content of the present disclosure should be included within the scope of protection of the present disclosure.

What is claimed is:

1. A data transmission method, comprising:
transmitting, by a virtual camera driver, a data request instruction to a service module in response to a virtual camera of a conferencing application being selected;
starting, by the service module, a first data screen mirroring application in response to the data request instruction; wherein the conferencing application, the first data screen mirroring application, the virtual camera driver and the service module are run on a terminal device;
establishing a communication connection between the terminal device and a target device by connecting the first data screen mirroring application with a second data screen mirroring application; wherein the second data screen mirroring application is run on the target device;
transmitting a media-data obtaining instruction to the second data screen mirroring application through the first data screen mirroring application;
receiving, by the first data screen mirroring application, first media data collected by a camera of the target device based on the media-data obtaining instruction; and
transmitting the first media data to the virtual camera driver through the first data screen mirroring application so as to display a first video frame corresponding to the first media data on the conferencing application.

2. The data transmission method of claim 1, further comprising:
before starting, by the service module, the first data screen mirroring application, or before receiving, by the first data screen mirroring application, the first media data, transmitting, by the service module, a preset image to the virtual camera driver so as to display a second video frame corresponding to the preset image on the conferencing application.

3. The data transmission method of claim 1, further comprising:
when receiving, by the first data screen mirroring application, the first media data, transmitting, by the first data screen mirroring application, a disconnect instruction to the service module; and
disconnecting, by the service module, the connection with the virtual camera driver in response to the disconnect instruction, so as to stop transmitting the preset image to the virtual camera driver.

4. The data transmission method of claim 2, wherein the preset image comprises at least one of text information or graphic information for guiding user operations.

5. The data transmission method of claim 1, wherein before transmitting, by the first data screen mirroring application, the first media data to the virtual camera driver through the first data screen mirroring application, the method further comprises:
transmitting a verification data packet to the virtual camera driver through the first data screen mirroring application; and
verifying the verification data packet through the virtual camera driver; wherein,
when the verification passes, issuing a first response instruction to the first data screen mirroring application through the virtual camera driver, wherein the first response instruction indicates that the first data screen mirroring application has permission to write data to the virtual camera driver; and
when the verification fails, issuing a second response instruction to the first data screen mirroring application through the virtual camera driver, wherein the second response instruction indicates that the first data screen mirroring application has no permission to write data to the virtual camera driver.

6. The data transmission method of claim 5, wherein the verifying the verification data packet through the virtual camera driver comprises:
parsing the verification data packet through the virtual camera driver to parse out a process identifier; and
determining whether the process identifier is a process identifier of an application layer on the terminal device; wherein,
when the process identifier is a process identifier of an application layer on the terminal device, determining that the verification passes, and when the process identifier is not a process identifier of an application layer on the terminal device, determining that the verification fails.

7. The data transmission method of claim 1, wherein the establishing a communication connection between the terminal device and a target device by connecting the first data screen mirroring application with a second data screen mirroring application comprises:
when the number of target devices is one, establishing a communication connection between the terminal device and the target device by connecting the first data screen mirroring application with the second data screen mirroring application on the target device; and
when the number of target devices is multiple, determining one of the target devices to be connected based on a device selection or device connection history information, and establishing a communication connection between the terminal device and the one of the target devices to be connected by connecting the first data screen mirroring application with the second data screen mirroring application on the one of the target devices to be connected.

8. The data transmission method of claim 1, wherein:
the terminal device comprises at least one of a laptop computer, a smart phone, a tablet computer or a desktop computer; and
the target device comprises an intelligent interactive white board or an electronic equipment.

9. A data transmission method, comprising:
starting a first data screen mirroring application in response to a virtual camera of a conferencing application being selected; wherein the conferencing application and the first data screen mirroring application are run on a terminal device;
establishing a communication connection between the terminal device and a target device by connecting the first data screen mirroring application with a second data screen mirroring application; wherein the second data screen mirroring application is run on the target device;
transmitting a media-data obtaining instruction to the second data screen mirroring application through the first data screen mirroring application;
receiving first media data collected by a camera of the target device based on the media-data obtaining instruction; and
transmitting the first media data to the conferencing application through the first data screen mirroring application so as to display a first video frame corresponding to the first media data on the conferencing application.

10. The data transmission method of claim 9, wherein the establishing a communication connection between the terminal device and a target device by connecting the first data screen mirroring application with a second data screen mirroring application comprises:
when the number of target devices is one, establishing a communication connection between the terminal device and the target device by connecting the first data screen mirroring application with the second data screen mirroring application on the target device; and
when the number of target devices is multiple, determining one of the target devices to be connected based on a device selection or device connection history information, and establishing a communication connection between the terminal device and the one of the target devices to be connected by connecting the first data screen mirroring application with the second data screen mirroring application on the one of the target devices to be connected.

11. The data transmission method of claim 9, wherein the terminal device comprises at least one of a laptop computer, a smart phone, a tablet computer or a desktop computer; and the target device comprises an intelligent interactive white board or an electronic equipment.

12. A non-transitory computer-readable storage medium storing computer-readable instructions, wherein the computer-readable instructions, when executed by one or more processors, cause the one or more processors to perform operations comprising:
transmitting, by a virtual camera driver, a data request instruction to a service module in response to a virtual camera of a conferencing application being selected;
starting, by the service module, a first data screen mirroring application in response to the data request instruction; wherein the conferencing application, the first data screen mirroring application, the virtual camera driver and the service module are run on a terminal device;
establishing a communication connection between the terminal device and a target device by connecting the first data screen mirroring application with a second data screen mirroring application; wherein the second data screen mirroring application is run on the target device;
transmitting a media-data obtaining instruction to the second data screen mirroring application through the first data screen mirroring application;
receiving, by the first data screen mirroring application, first media data collected by a camera of the target device based on the media-data obtaining instruction; and
transmitting the first media data to the virtual camera driver through the first data screen mirroring application so as to display a first video frame corresponding to the first media data on the conferencing application.

13. The non-transitory computer-readable storage medium of claim 12, wherein the operations further comprise:
before starting, by the service module, the first data screen mirroring application, or before receiving, by the first data screen mirroring application, the first media data, transmitting, by the service module, a preset image to the virtual camera driver so as to display a second video frame corresponding to the preset image on the conferencing application.

14. The non-transitory computer-readable storage medium of claim 12, wherein the operations further comprise:
when receiving, by the first data screen mirroring application, the first media data, transmitting, by the first data screen mirroring application, a disconnect instruction to the service module; and
disconnecting, by the service module, the connection with the virtual camera driver in response to the disconnect instruction, so as to stop transmitting the preset image to the virtual camera driver.

15. The non-transitory computer-readable storage medium of claim 13, wherein the preset image comprises at least one of text information or graphic information for guiding user operations.

16. The non-transitory computer-readable storage medium of claim 12, wherein before transmitting, by the first data screen mirroring application, the first media data to the virtual camera driver through the first data screen mirroring application, further comprises:
- transmitting a verification data packet to the virtual camera driver through the first data screen mirroring application; and
- verifying the verification data packet through the virtual camera driver; wherein,
  - when the verification passes, issuing a first response instruction to the first data screen mirroring application through the virtual camera driver; wherein the first response instruction indicates that the first data screen mirroring application has permission to write data to the virtual camera driver; and
  - when the verification fails, issuing a second response instruction to the first data screen mirroring application through the virtual camera driver; wherein the second response instruction indicates that the first data screen mirroring application has no permission to write data to the virtual camera driver.

17. The non-transitory computer-readable storage medium of claim 16, wherein the verifying the verification data packet through the virtual camera driver comprises:
- parsing the verification data packet through the virtual camera driver to parse out a process identifier;
- determining whether the process identifier is a process identifier of an application layer on the terminal device, wherein,
  - when the process identifier is a process identifier of an application layer on the terminal device, determining that the verification passes, and
  - when the process identifier is not a process identifier of an application layer on the terminal device, determining that the verification fails.

18. The non-transitory computer-readable storage medium of claim 12, wherein the establishing a communication connection between the terminal device and a target device by connecting the first data screen mirroring application with a second data screen mirroring application comprises:
- when the number of target devices is one, establishing a communication connection between the terminal device and the target device by connecting the first data screen mirroring application with the second data screen mirroring application on the target device; and
- when the number of target devices is multiple, determining one of the target devices to be connected based on a device selection or device connection history information, and establishing a communication connection between the terminal device and the one of the target devices to be connected by connecting the first data screen mirroring application with the second data screen mirroring application on the one of the target devices to be connected.

19. The non-transitory computer-readable storage medium of claim 12, wherein the terminal device comprises at least one of a laptop computer, a smart phone, a tablet computer or a desktop computer; and the target device comprises an intelligent interactive white board or an electronic equipment.

* * * * *